US011884336B2

(12) United States Patent
Hanley

(10) Patent No.: US 11,884,336 B2
(45) Date of Patent: Jan. 30, 2024

(54) MODULAR WIND FAIRINGS AND METHODS OF USE

(71) Applicant: DEJANA TRUCK AND UTILITY EQUIPMENT CO., INC., Kings Park, NY (US)

(72) Inventor: Charles L. Hanley, North Smithfield, RI (US)

(73) Assignee: DEJANA TRUCK AND UTILITY EQUIPMENT CO., INC., Kings Park, NY (US)

( * ) Notice: Subject to any disclaimer, the term of this patent is extended or adjusted under 35 U.S.C. 154(b) by 0 days.

(21) Appl. No.: 18/114,411

(22) Filed: Feb. 27, 2023

(65) Prior Publication Data

US 2023/0219638 A1    Jul. 13, 2023

Related U.S. Application Data

(63) Continuation of application No. 17/715,455, filed on Apr. 7, 2022, now Pat. No. 11,608,124, which is a continuation of application No. 16/740,966, filed on Jan. 13, 2020, now Pat. No. 11,312,426.

(51) Int. Cl.
*B62D 35/00* (2006.01)

(52) U.S. Cl.
CPC ................. *B62D 35/001* (2013.01)

(58) Field of Classification Search
CPC .................. B62D 35/001; Y02T 10/82
See application file for complete search history.

(56) References Cited

U.S. PATENT DOCUMENTS

| | | | | | |
|---|---|---|---|---|---|
| 4,408,792 A | * | 10/1983 | Sullivan | ............... | B62D 35/001 296/180.2 |
| 4,784,424 A | * | 11/1988 | Wiley, Jr. | ............. | B62D 35/001 296/180.2 |
| 4,824,165 A | * | 4/1989 | Fry | ...................... | B62D 35/001 296/180.5 |
| 4,883,307 A | * | 11/1989 | Hacker | ................ | B62D 35/001 296/180.2 |
| 4,888,307 A | * | 12/1989 | Spairisano | ............. | B29C 70/72 174/541 |
| 4,919,472 A | * | 4/1990 | Wiley, Jr. | ............. | B62D 35/001 296/180.2 |
| 4,932,716 A | * | 6/1990 | Marlowe | ................ | B62D 33/06 296/180.2 |
| 4,957,322 A | * | 9/1990 | Marlowe | .............. | B62D 35/001 296/180.2 |
| 5,004,293 A | * | 4/1991 | Thomas | ............... | B62D 35/001 296/190.08 |

(Continued)

FOREIGN PATENT DOCUMENTS

| | | | | |
|---|---|---|---|---|
| CA | 2583811 A1 | * | 10/2008 | ........... B62D 35/001 |
| WO | WO-2016077669 A1 | * | 5/2016 | ......... B29C 45/0001 |

(Continued)

*Primary Examiner* — Lori Lyjak
(74) *Attorney, Agent, or Firm* — Sorell, Lenna & Schmidt, LLP

(57) ABSTRACT

A fairing includes a first part including a wall having and a top flange extending from the wall. A second part of the fairing includes a body and a bottom flange extending from the body. The bottom flange is configured to engage the top flange to couple the second part to the first part.

20 Claims, 13 Drawing Sheets

(56) References Cited

U.S. PATENT DOCUMENTS

| | | | | |
|---|---|---|---|---|
| 5,078,448 | A * | 1/1992 | Selzer | B62D 35/001 |
| | | | | 296/180.2 |
| 5,092,648 | A * | 3/1992 | Spears | B62D 35/001 |
| | | | | 296/180.5 |
| 5,249,837 | A * | 10/1993 | Luttrell | B62D 35/001 |
| | | | | 296/180.3 |
| 5,603,549 | A * | 2/1997 | Chen | B62D 27/026 |
| | | | | 296/180.1 |
| 6,099,069 | A * | 8/2000 | Spears | B60T 1/16 |
| | | | | 296/180.5 |
| 6,217,107 | B1 * | 4/2001 | Langlois | B62D 35/001 |
| | | | | 296/180.2 |
| 9,327,779 | B1 * | 5/2016 | Wey | B60R 19/18 |
| 9,937,965 | B1 * | 4/2018 | Herpel | B62D 33/08 |
| 2005/0281042 | A1 * | 12/2005 | Kawai | B62D 35/001 |
| | | | | 362/493 |
| 2007/0085377 | A1 * | 4/2007 | Boucher | B60J 1/2002 |
| | | | | 296/180.2 |
| 2008/0244907 | A1 * | 10/2008 | Boucher | B62D 35/001 |
| | | | | 296/180.2 |
| 2014/0054923 | A1 * | 2/2014 | Rode | B62D 35/001 |
| | | | | 296/180.2 |
| 2014/0084625 | A1 * | 3/2014 | Ramos | B60J 1/02 |
| | | | | 296/180.2 |
| 2014/0265433 | A1 * | 9/2014 | Fritts | B62D 35/001 |
| | | | | 296/180.2 |

FOREIGN PATENT DOCUMENTS

| | | | | |
|---|---|---|---|---|
| WO | WO-2018071830 A1 * | 4/2018 | ............ | B62D 35/001 |
| WO | WO-2019115223 A1 * | 6/2019 | ............ | B62D 35/001 |

\* cited by examiner

MODULAR WIND FAIRINGS AND METHODS OF USE

CROSS REFERENCE TO RELATED APPLICATIONS

This application is a continuation of U.S. patent application Ser. No. 17/715,455, filed on Apr. 7, 2022, which is a continuation of U.S. patent application Ser. No. 16/740,966, filed Jan. 13, 2020, now U.S. Pat. No. 11,312,426. These applications are expressly incorporated herein by reference, in their entireties.

TECHNICAL FIELD

The present disclosure generally relates to wind deflectors, and more particularly to modular wind fairings configured for attachment to a vehicle and a trailer.

BACKGROUND

Wind fairings are often mounted to a cab of a vehicle, such as, for example, a tractor or a truck to reduce air resistance or drag on a trailer that is pulled by the vehicle. The wind fairings are configured to direct wind over the planar top walls of the trailers, rather than into a gap between the vehicle and the trailer, for example, to reduce the drag resistance transferred from the trailers to the vehicles and thereby improve fuel economy.

Wind fairings that are currently standard in the industry typically utilize a one-piece design. However, such one-piece wind fairings are generally configured to fit only one specific truck, for example a specific make, model and year vehicle. That is, one-piece wind fairings are not capable of being properly fitted to different vehicles having different makes, models and/or years. Indeed, to be mounted to a vehicle in a substantially air-tight manner, features of the wind fairing must conform to features of the vehicle, such as, for example, a roof profile of the vehicle to eliminate any gaps between the wind fairing and the vehicle. As such, a unique one-piece wind fairing is required to be designed for each make, model and year vehicle. This requires a supplier to include a vast number of one-piece wind fairings, each being configured to fit a different make, model and year vehicle. Furthermore, conventional wind fairings are essentially dead space, as they do not provide any accessible space for storage or the like. This disclosure describes improvements over these prior art technologies.

SUMMARY

In one embodiment, in accordance with the principles of the present disclosure, a wind fairing is provided. The wind fairing includes a first part comprising a wall having a first section extending along a longitudinal axis between opposite first and second ends. The wall comprises a second section extending from the first end and a third section extending from the second end. The second and third sections each extend transverse to the longitudinal axis. The first part comprises a top flange extending from a top of the wall and a bottom flange extending from a bottom of the wall. A second part of the wind fairing comprises a body having opposite first and second side walls. The body comprises a front wall extending from the first side wall to the second side wall. The second part comprises a bottom flange extending from a bottom of the front wall and bottoms of the first and second side walls. The bottom flange of the second part is configured to engage the top flange to couple the second part to the first part.

In one embodiment, in accordance with the principles of the present disclosure, a method is provided. The method includes providing a wind fairing having a first part comprising a wall having a first section extending along a longitudinal axis between opposite first and second ends. The wall comprises a second section extending from the first end and a third section extending from the second end. The second and third sections each extend transverse to the longitudinal axis. The first part comprises a top flange extending from a top of the wall and a bottom flange extending from a bottom of the wall. A second part of the wind fairing comprises a body having opposite first and second side walls. The body comprises a front wall extending from the first side wall to the second side wall. The second part comprises a bottom flange extending from a bottom of the front wall and bottoms of the first and second side walls. The bottom flange of the second part is configured to engage the top flange to couple the second part to the first part. The method further comprises inserting fasteners through holes in the bottom flange of the first part and a roof of a vehicle to couple the first part to the roof; and inserting fasteners through holes in the top flange and the bottom flange of the second part to couple the first part to the second part.

In one embodiment, in accordance with the principles of the present disclosure, a system is provided. The system includes providing a wind fairing having a first part comprising a wall having a first section extending along a longitudinal axis between opposite first and second ends. The wall comprises a second section extending from the first end and a third section extending from the second end. The second and third sections each extend transverse to the longitudinal axis. The first part comprises a top flange extending from a top of the wall and a bottom flange extending from a bottom of the wall. A second part of the wind fairing comprises a body having opposite first and second side walls. The body comprises a front wall extending from the first side wall to the second side wall. The second part comprises a bottom flange extending from a bottom of the front wall and bottoms of the first and second side walls. The bottom flange of the second part is configured to engage the top flange to couple the second part to the first part. The second part is a first second part and the system further comprises a second second part and a third second part. The second second part differs from the first second part only with respect to a dimension selected from the group consisting of height and width. The third second part differs from the first second part and the second second part only with respect to a dimension selected from the group consisting of height and width.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION

Figure 1:
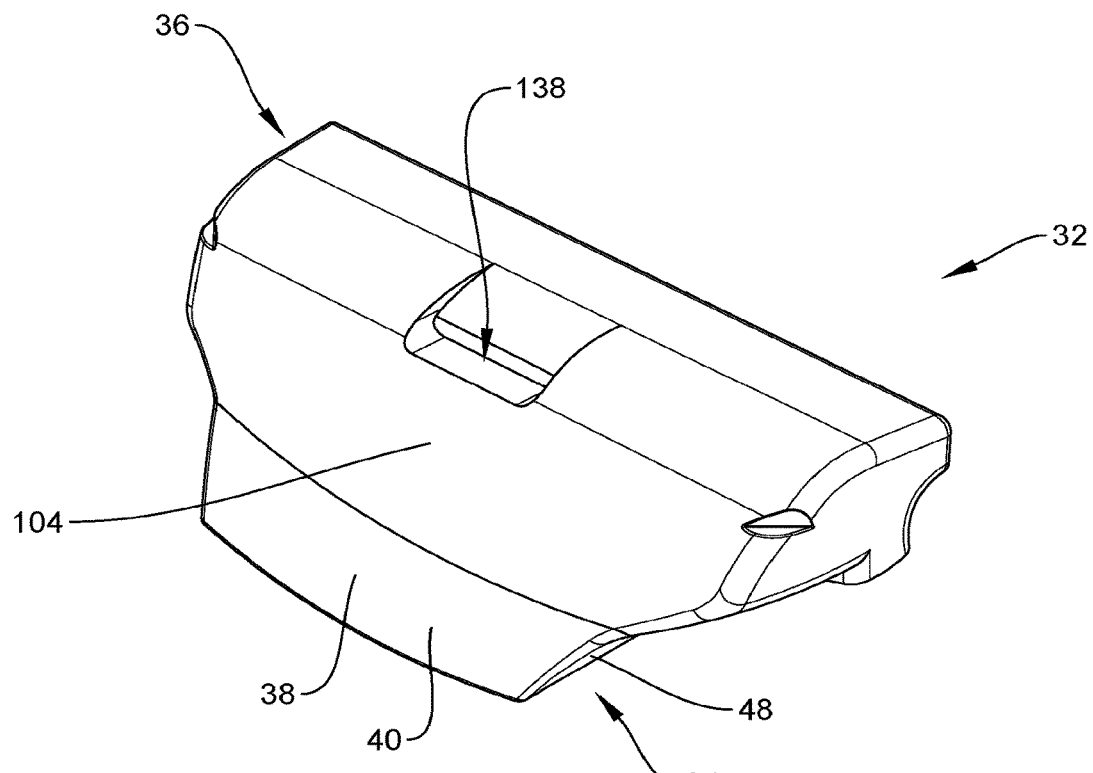
FIG. 1 is a perspective view of one embodiment of a wind fairing in accordance with the principles of the present disclosure.
Figure 2:
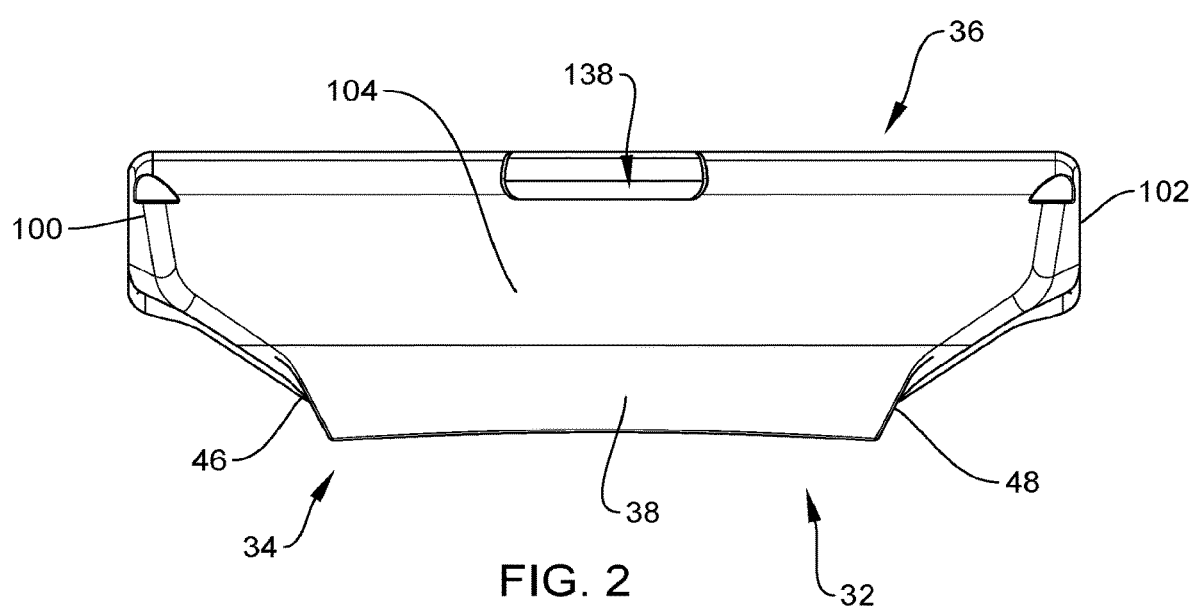
FIG. 2 is a front view of the wind fairing shown in FIG. 1.
Figure 3:
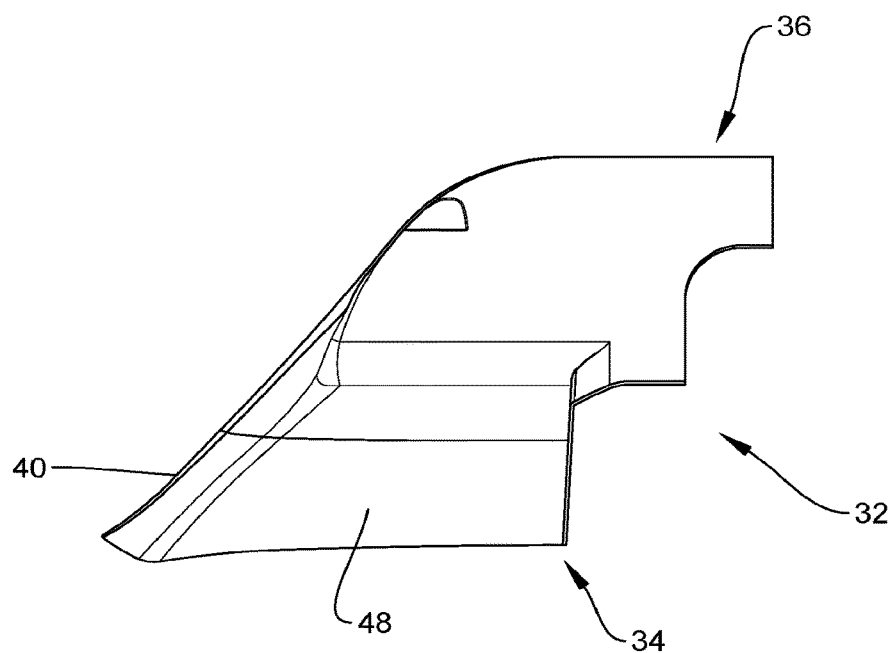
FIG. 3 is a side view of the wind fairing shown in FIG. 1.

The exemplary embodiments of an air deflection system and related methods of use are discussed in terms of wind deflectors, and more particularly to modular wind fairings configured for attachment to a vehicle and a trailer. The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "upper" and "lower" are relative and used only in the context to the other, and are not necessarily "superior" and "inferior".

The following discussion includes a description of an air deflection system, related components and methods of employing the air deflection system in accordance with the principles of the present disclosure. Alternate embodiments are also disclosed. Reference will now be made in detail to the exemplary embodiments of the present disclosure, which are illustrated in the accompanying figures. Turning to FIGS. 1-27A, there are illustrated components of an air deflection system 30.

The components of air deflection system 30 can be fabricated from materials including metals, polymers and/or composites, depending on the particular application. For example, the components of system 30, individually or collectively, can be fabricated from materials such as fiberglass, molded plastic, aluminum, steel, iron, stainless steel, titanium, titanium alloys, cobalt-chrome, stainless steel alloys, semi-rigid and rigid materials, elastomers, rubbers and/or rigid polymers. Various components of system 30 may have material composites, including the above materials, to achieve various desired characteristics such as strength, rigidity, elasticity, performance and durability. The components of system 30, individually or collectively, may also be fabricated from a heterogeneous material such as a combination of two or more of the above-described materials. The components of system 30 can be extruded, molded, injection molded, cast, pressed and/or machined. The components of system 30 may be monolithically formed, integrally connected or include fastening elements and/or instruments, as described herein.

In some embodiments, system 30 is configured to replace one-piece wind fairings that are each configured for only one vehicle make, model and year. That is, each one-piece wind fairing is adapted to fit only one unique vehicle. Indeed, it is important that wind fairings be mounted to a vehicle and/or trailer in an air tight manner to prevent any gaps between the wind fairing and the vehicle and/or trailer since such gaps may reduce or eliminate any advantage provided by using the wind fairing. As such, suppliers and/or distributors are required to have an inventory that includes many, many different one-piece wind fairings to accommodate different vehicles, which take up a lot of space and is quite costly. Accordingly, system 30 includes wind fairings having a modular, two-piece design, which both reduces the amount of on-hand inventory required and adds manufacturing flexibility.

In some embodiments, system 30 includes a modular, two-piece having a plurality of different chassis-specific roof cab collars and a single upper section that fits all vehicle body configurations and can be connected with each of the different chassis-specific roof cab collars. In such embodiments, changes between different vehicle years, models, etc. will not require any retooling of the upper section, as only the roof cab collar will need to change.

In some embodiments, system 30 includes a modular wind fairing having an internal floor shelf to gain additional storage space. That is, an interior of the wind fairing is accessible from outside to allow cargo or other items to be stored within the wind fairing. In some embodiments, the interior of the wind fairing is accessible through a cutout made into the front wall of a truck body.

In some embodiments, system 30 includes a modular wind fairing having a roof cab collar and an upper section that is removably coupled to the roof cab collar. The roof cab collar is bonded to the roof of a vehicle using an adhesive sealant, such as, for example, a urethane adhesive sealant and mechanical fasteners, such as, for example, bolts. An inward facing flange across the lower perimeter of the roof cab collar mates with the cab roof and serves as an attachment point. In some embodiments, a bead of adhesive sealant is first applied to the bottom flange of the roof cab collar. The roof cab collar is then set in place on the cab roof. Bolts are then added for additional securement.

The upper section is bonded to the roof cab collar using a urethane adhesive sealant along with a few mechanical fasteners. In particular, a bead of adhesive sealant is first applied to the top flange of the roof cab collar. The upper section is then set in place on the roof cab collar, while also being slid over the front wall of the truck body. A bead of sealant is then applied to the exterior joint between the roof cab collar and the upper section. There is an inward facing flange across the lower perimeter of the upper section that matches up with a mating inward facing flange across the upper perimeter of the roof cab collar and serves as an attachment point. Bolts are inserted through the flanges for additional securement of the roof cab collar to the upper section. There is also a small vertical flange running along the extreme inner edge of the upper flange on the roof cab collar that serves as both a locator and a water stop. On back flanges of the upper section, which is the truck body side, the assembly has been designed to slide over and overlap the truck body for a sock-like fit. Bolts are then added to secure the overlapping flanges of the upper section to the truck body. In some embodiments, corner post notches are located at the outermost extremities of the upper section at the truck body interface that serve as a clearance notch for the juncture between the two. Since the corner posts of the truck body itself overlap the front wall panel of said body, the clearance notches add the accommodation required for this change in front wall thickness, and allow the upper section to install flat against the front wall. Sealant is also applied to all joints at the interface between the upper wind fairing and the truck body.

In some embodiments, system 30 includes a modular wind fairing having a plurality of different roof cab collars and one or a plurality of upper sections that can be connected with one or more of the roof cab collars. The roof cab collars all share a common upper mating surface where they would attach their respective upper section, but differ dimensionally on their lower surfaces, which have been designed to mate with the curvature of the cab roofs, and are specific to each made and model of truck.

In some embodiments, system 30 includes a modular wind fairing having one or a plurality of roof cab collars and one or a plurality of upper sections that can be connected with one or more of the roof cab collars. The roof cab collars each include a first side having a first blend angle and a second side having a second blend angle. The first and second blend angles correspond to blend angles of sides of the upper sections such that there is a smooth transition between the first and second sides of the roof cab collars and the upper sections when the upper sections are coupled to the roof cab collars, as discussed herein. In some embodiments, the blend angles of the sides of the roof cab collar and the upper section and the curvature of the sides of the roof cab collar and the upper section are configured to transition the squared shape of the truck body down to the curved shape of the truck cab. In some embodiments, the blend angles are about 35 degrees.

In some embodiments, system 30 includes a modular wind fairing having one or a plurality of roof cab collars and one or a plurality of upper sections that can be connected with one or more of the roof cab collars. The roof cab collars each include a face having a blend angle that corresponds to a blend angle of a face of the upper sections such that there is a smooth transition between the faces of the cab collars and the upper sections when the upper sections are coupled to the roof cab collars, as discussed herein. In some embodiments, the blend angles of the face of the roof cab collar and face of the upper section and the curvature of the face of the roof cab collar and the upper section are configured to transition the raked front face of the upper section through a radius to a flat surface of the truck body roof. In some embodiments, the blend angles are about 50 degrees.

In some embodiments, system 30 includes a wind fairing, such as, for example, a modular wind fairing 32. Wind fairing 32 includes a part 34 and a part 36 that is configured to be coupled to part 34 to form wind fairing 32, as shown in FIGS. 1-6, for example. Part 34 comprises a wall 38 having a section 40 extending along a horizontal axis, such as, for example, a longitudinal axis X1 from an end 42 to an opposite end 44, as shown in FIGS. 7-13, for example. Wall 38 includes a section 46 extending along a horizontal axis, such as, for example, a longitudinal axis X2 from an end 50 of section 46 to an opposite end 52 of section 46. Wall 38 includes a section 48 extending along a horizontal axis, such as, for example, a longitudinal axis X3 from an end 54 of section 48 to an opposite end 56 of section 48. In some embodiments, end 50 directly engages end 42 and end 54 directly engages end 44. In some embodiments, part 34 is monolithically and/or integrally formed.

In some embodiments, axis X2 extends substantially parallel (within ten degrees of an absolutely parallel orientation and more preferably within five degrees of an absolutely parallel orientation) to axis X3. In some embodiments, axis X2 extends parallel (absolutely parallel) to axis X3. In some embodiments, axis X2 may be disposed at alternate orientations, relative to axis X3, such as, for example, transverse and/or other angular orientations such as acute or obtuse, and/or may be offset or staggered. In some embodiments, axes X2, X3 extend transverse and/or perpendicular relative to axis X1. In some embodiments, axes X2, X3 extend between about 60 degrees and about 120 degrees relative to axis X1. In some embodiments, axes X2, X3 extend between about 70 degrees and about 110 degrees relative to axis X1. In some embodiments, axes X2, X3 extend between about 90 degrees and about 100 degrees relative to axis X1. In some embodiments, axes X2, X3 extend between 90 degrees relative to axis X1.

Figure 9:
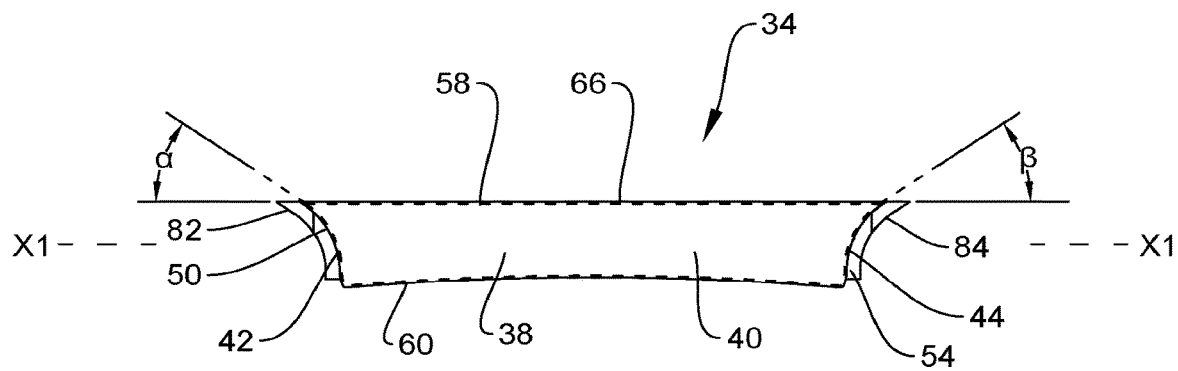
FIG. 9 is a front view of the component shown in FIG. 7.

Wall 38 extends along a vertical axis, such as, for example, a longitudinal axis X4 from a top of wall 38, such as, for example, an end 58 of wall 38 and a bottom of wall 38, such as, for example, an end 60 of wall 38 that is opposite end 58. End 58 extends parallel to axis X1, as shown in FIG. 9. In some embodiments, sections 46, 48 are each tapered inwardly such that end 58 at section 46 is spaced apart a first distance from end 58 at section 48 and end 60 at section 46 is spaced apart a second distance from end 60 at section 48, the second distance being less than the first distance. As such, an interface between ends 42, 50 extends at an angle α relative to end 58 and/or axis X4 and an interface between ends 44, 54 extends at an angle β relative to end 58 and/or axis X4, as also shown in FIG. 9. In some embodiments, angle β is different than angle α. In some embodiments, angle β is an inverse angle of angle α. In some embodiments, angle β is equal to angle α. In some embodiments, angle α and angle β are blend angles that are configured to form a smooth transition with part 36 when part 36 is coupled to part 34, as discussed herein. In some embodiments, angle α and angle β are blend angles between about 5 degrees and about 65 degrees. In some embodiments, angle α and angle β are blend angles between about 15 degrees and about 55 degrees. In some embodiments, angle α and angle β are blend angles between about 25 degrees and about 45 degrees. In some embodiments, angle α and angle β are blend angles of 35 degrees. In some embodiments, the interface between ends 42, 50 and/or the interface between ends 44, 54 may be disposed at alternate orientations, relative to axis X4, such as, for example, transverse, perpendicular and/or other angular orientations such as acute or obtuse, and/or may be offset or staggered.

Figure 10:
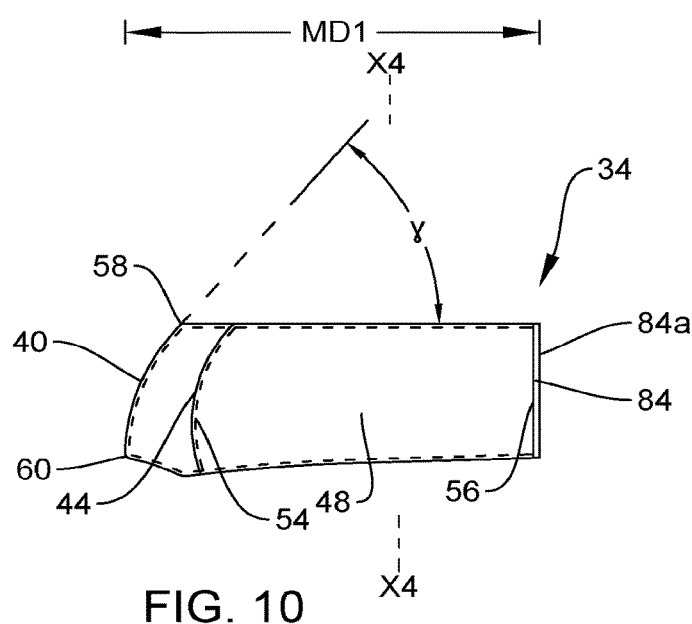
FIG. 10 is a side view of the component shown in FIG. 7.

In some embodiments, an outer surface 62 of section 40 is convexly curved from end 58 to end 60 and an opposite inner surface 64 of section 40 is concavely curved from end 58 to end 60 such that section 40 extends at an angle γ relative to axis X4, as shown in FIG. 10. In some embodiments, angle γ is a blend angle that is configured to form a smooth transition with part 36 when part 36 is coupled to part 34, as discussed herein. In some embodiments, angle γ is a blend angle between about 20 degrees and about 80 degrees. In some embodiments, angle γ is a blend angle between about 30 degrees and about 70 degrees. In some embodiments, angle γ is a blend angle between about 40 degrees and about 60 degrees. In some embodiments, angle γ is a blend angle of 50 degrees. In some embodiments, section 40 may be disposed at alternate orientations, relative to axis X4, such as, for example, transverse, perpendicular and/or other angular orientations such as acute or obtuse, and/or may be offset or staggered.

Figure 12:
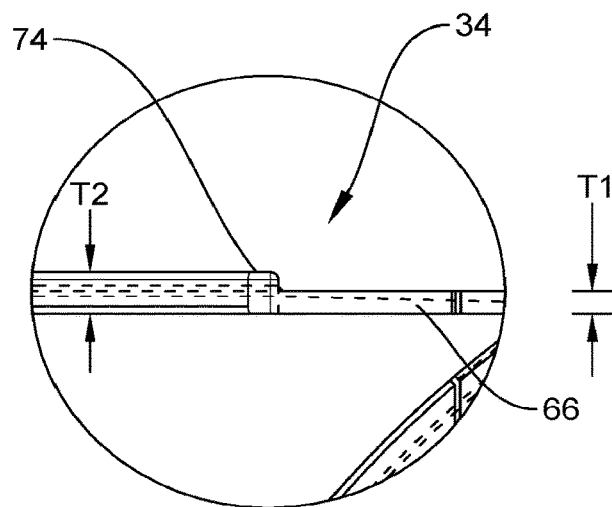
FIG. 12 is an enlarged, close up view of a portion of the component shown in FIG. 7 shown in Detail C in FIG. 11.

Part 34 comprises a top flange, such as, for example, a flange 66 extending from end 58 and a bottom flange, such as, for example, a flange 68 extending from end 60 such that flange 68 is spaced apart from flange 66 by wall 38. Flange 66 is configured to couple part 36 to part 34 and flange 68 is configured to couple part 34 to a vehicle, such as, for example, a roof of a cab of a vehicle, as discussed herein. Flange 66 includes an inner edge, such as, for example, an edge 70 and an opposite outer edge, such as, for example, an edge 72. Edge 72 is flush with surface 62 such that edge 70 extends inwardly from surface 62. A vertical lip, such as, for example, a lip 74 extends outwardly from edge 70 such that lip 74 extends parallel to axis X4. Flange 66 has a maximum thickness T1 along axis X4 that is less than a maximum thickness T2 of lip 74 along axis X4, as shown in FIG. 12. In some embodiments, lip 74 is configured to serve as both a locator and a water stop, as discussed herein. In some embodiments, lip 74 may be disposed at alternate orientations, relative to axis X4, such as, for example, transverse and/or other angular orientations such as acute or obtuse, co-axial and/or may be offset or staggered.

Figure 13:
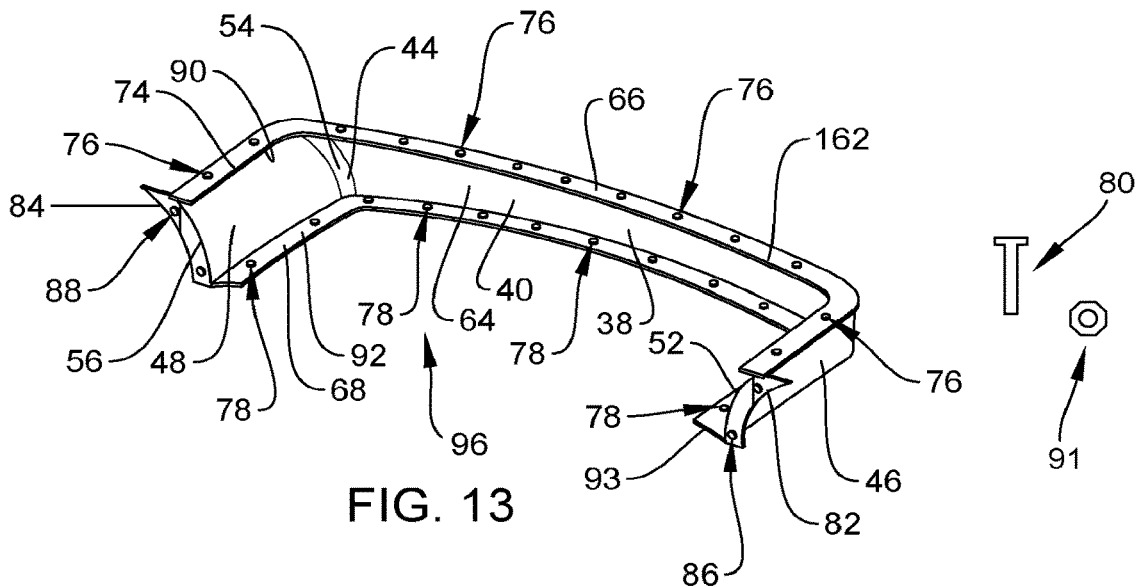
FIG. 13 is a perspective view of the component shown in FIG. 7.
Figure 14:
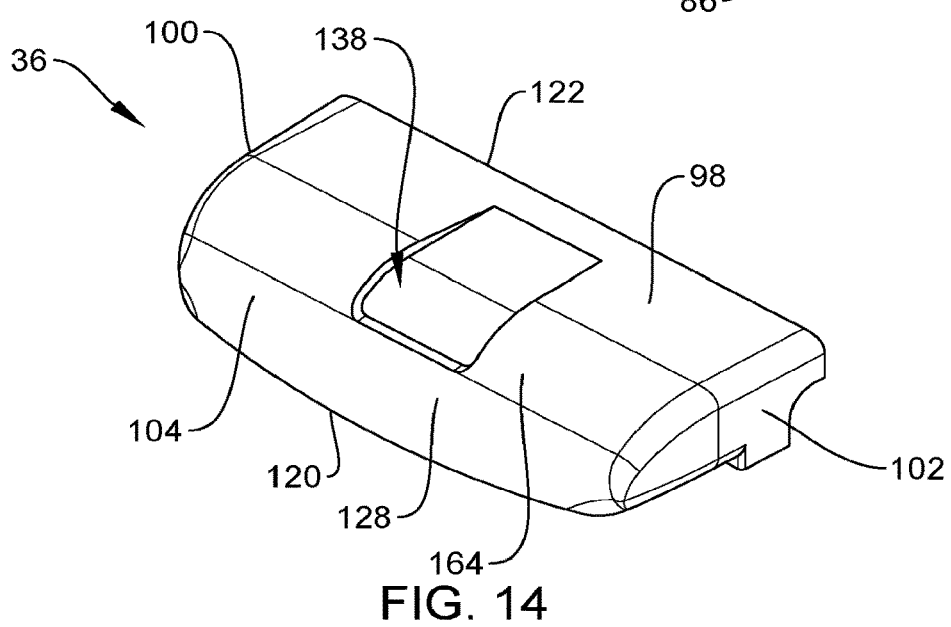
FIG. 14 is a perspective view of a component of the wind fairing shown in FIG. 1.
Figure 15:
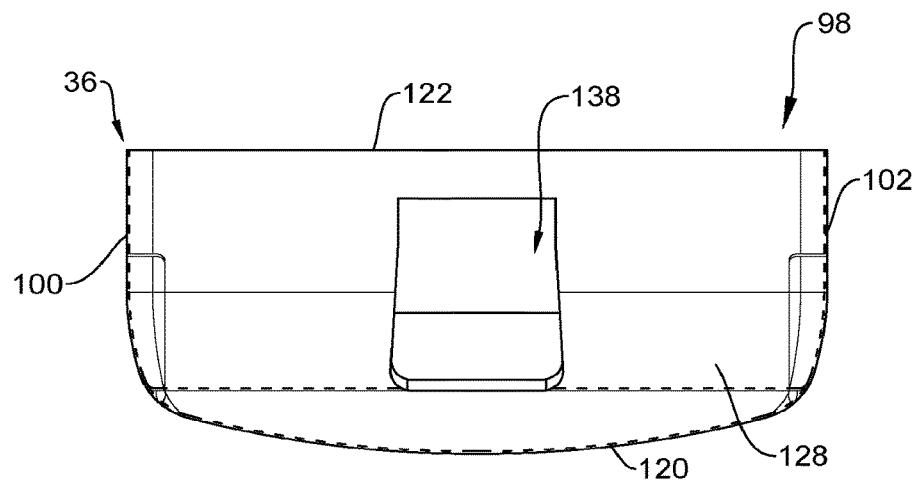
FIG. 15 is a top view of the component shown in FIG. 14.

In some embodiments, flange 66 and/or flange 68 has a solid configuration that is free of any cavities, holes, apertures, etc. In some embodiments, flange 66 includes a plurality of spaced apart holes 76 that each extend completely through a thickness of flange 66 and flange 68 includes a plurality of spaced apart holes 78 that each extend completely through a thickness of flange 68, as shown in FIG. 13. In some embodiments, holes 76 are offset from holes 78. In some embodiments, holes 76 are each aligned with one of holes 78 such that each of holes 76 is coaxial with one of holes 78. Holes 76 are each configured for disposal of a fastener, such as, for example, a bolt 80 such that bolt 80 extends through hole 76 and a flange of part 36 to couple part 36 to part 34, as discussed herein. A coupling member, such as, for example, a nut 81 can be threaded with bolt 80 to maintain bolt 80 in hole 76. Holes 78 are each configured for disposal of a fastener, such as, for example, bolt 80 such that bolt 80 extends through hole 78 and into a roof of a cab of a vehicle, for example, to couple part 34 to the roof of the cab of the vehicle, as discussed herein. A coupling member, such as, for example, nut 81 can be threaded with bolt 80 to maintain bolt 80 in hole 78. In some embodiments, holes 76 and/or holes 78 can have various shape configurations, such as, for example, circular, oval, oblong, polygonal, irregular, uniform, non-uniform, variable and/or tapered. In some embodiments, part 36 can be variously connected with part 34, such as, for example, frictional engagement, threaded engagement, mutual grooves, screws, adhesive, nails, barbs and/or raised element. In some embodiments, wall 38 is free of any holes, such as, for example, screw holes that extend parallel to axis X1, axis X2 and/or axis X3. In some embodiments, wall 38 is free of any holes, such as, for example, screw holes that extend into or through an outer surface 38a of wall 38 or an opposite inner surface 38b of wall 38. That is, all of the screw holes of part 34 are included either flange 66 or flange 68. In some embodiments, inner surface 38b is entirely smooth and/or is free of any pads, ribs and/or projections that extend from inner surface 38b. In some embodiments, wall 38 has a thickness defined by a distance from outer surface 38a to inner surface 38b, wherein the thickness of wall 38 is uniform from end 42 to end 44, from end 50 to end 52 and from end 54 to end 56.

Figure 11:
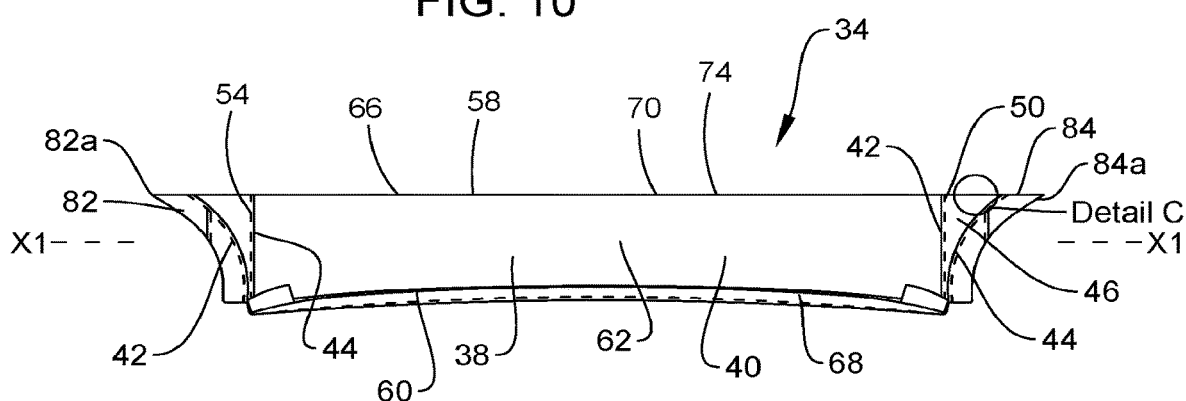
FIG. 11 is a front view of the component shown in FIG. 7.

In some embodiments, part 34 includes a side flange, such as, for example, a flange 82 extending from end 52 and a side flange, such as, for example, a flange 84 extending from end 56. In some embodiments, flange 82 and/or flange 84 has a solid configuration that is free of any cavities, holes, apertures, etc. In some embodiments, flange 82 includes one or a plurality of holes 86 that each extend completely through a thickness of flange 82 and flange 84 includes one or a plurality of holes 88 that each extend completely through a thickness of flange 84, as shown in FIG. 13. Holes 86, 88 are each configured for disposal of a fastener, such as, for example, bolt 80 such that bolt 80 extends through hole 86 or hole 88 and into a trailer that is coupled to a vehicle to couple part 34 to the trailer, as discussed herein. A coupling member, such as, for example, a nut 81 can be threaded with bolt 80 to maintain bolt 80 in hole 86 or hole 88. In some embodiments, holes 86 and/or holes 88 can have various shape configurations, such as, for example, circular, oval, oblong, polygonal, irregular, uniform, non-uniform, variable and/or tapered. In some embodiments, part 34 can be variously connected with a trailer, such as, for example, frictional engagement, threaded engagement, mutual grooves, screws, adhesive, nails, barbs and/or raised element. In some embodiments, part 34 has a maximum depth MD1 along axes X2, X3 wherein MD1 is defined by the distance from outer surface 62 to an outer surface of flange 82 or an outer surface 84a of flange 84, as shown in FIG. 10. In some embodiments, part 34 has a maximum width MW1 along axis X1 wherein MW1 is defined by the distance from a tip 82a of flange 82 to a tip 84a of flange 84, as shown in FIG. 11.

Figure 24:
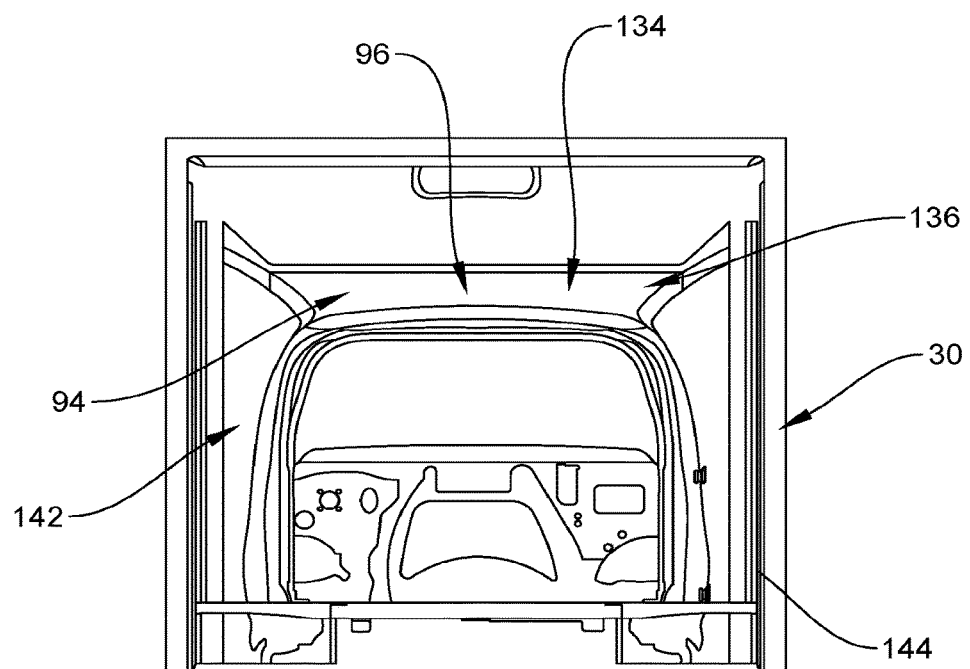
FIG. 24 is a rear view, in part phantom, of the system shown in FIG. 21.
Figure 25:
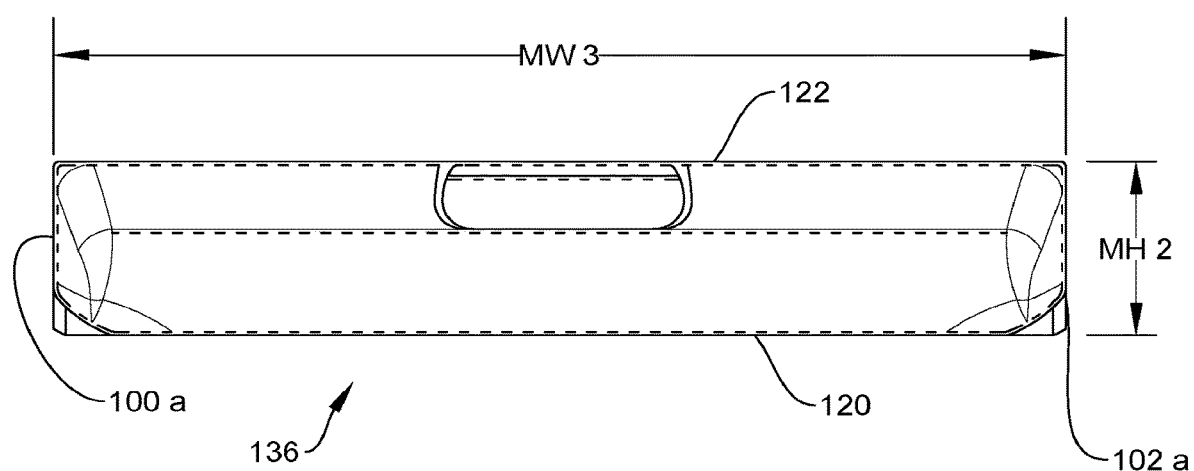
FIG. 25 is a front view of a component of a system in accordance with the principles of the present disclosure.
Figure 26:
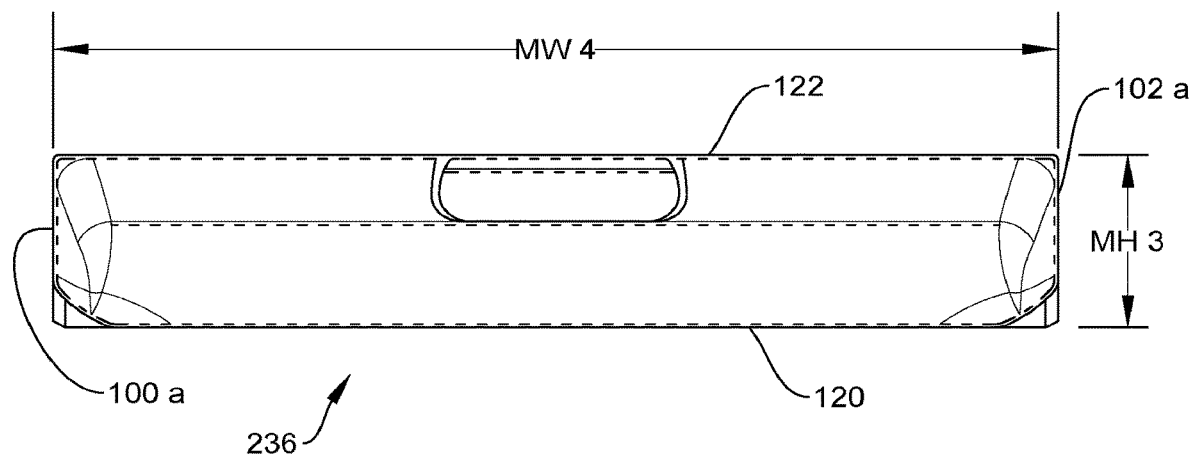
FIG. 26 is a front view of a component of a system in accordance with the principles of the present disclosure.
Figure 27:
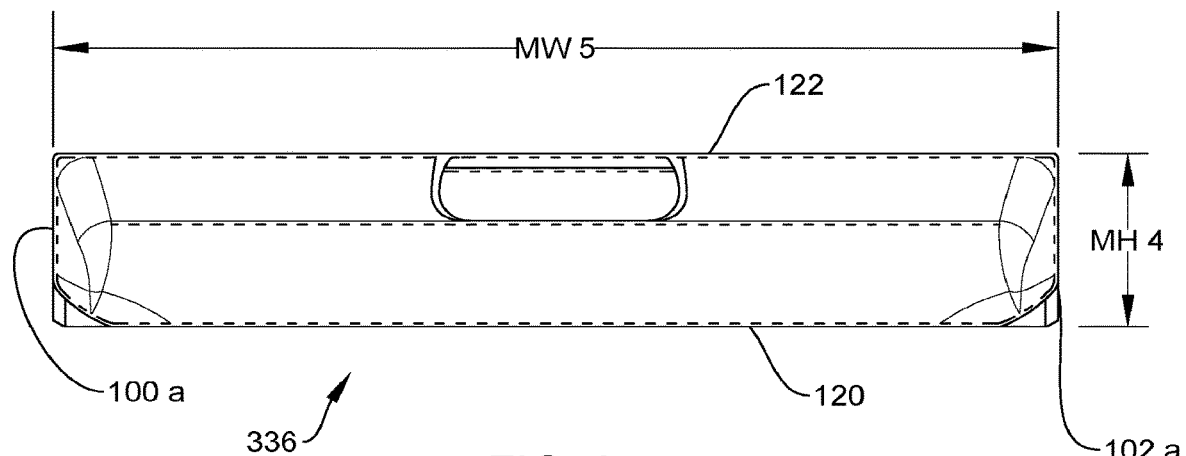
FIG. 27 is a front view of a component of a system in accordance with the principles of the present disclosure.
Figure 25A:
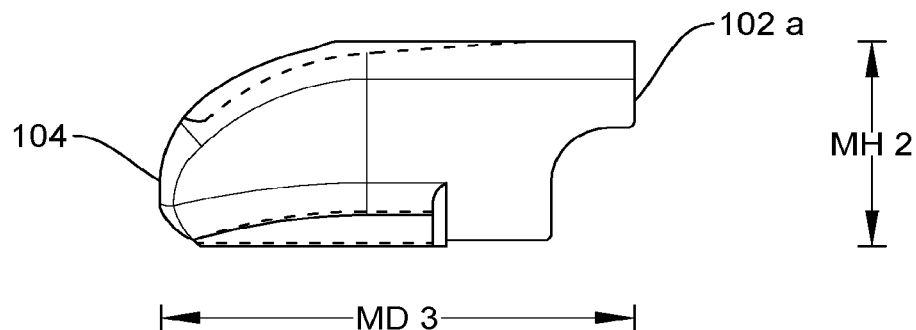
FIG. 25A is a side view of the component shown in FIG. 25.
Figure 26A:
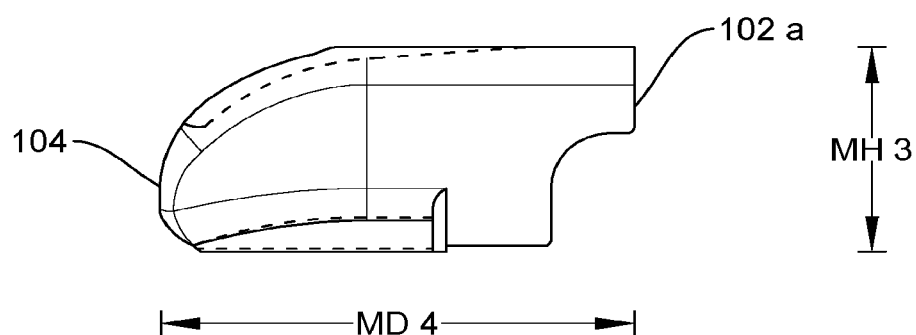
FIG. 26A is a side view of the component shown in FIG. 26.
Figure 27A:
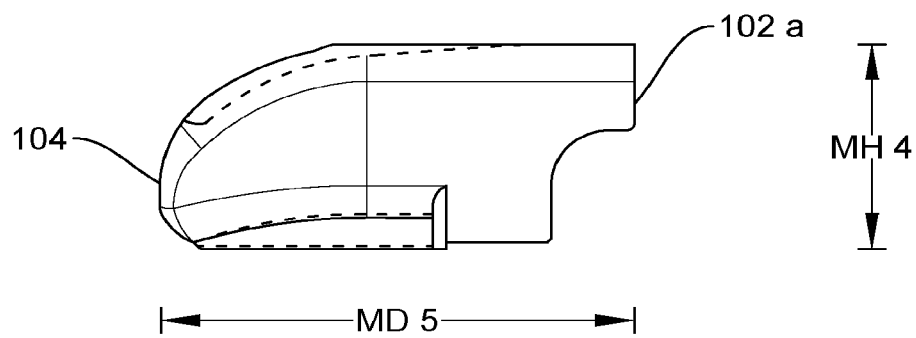
FIG. 27A is a side view of the component shown in FIG. 27.

Surface 64 of wall 38, a bottom surface 90 of flange 66, a top surface 92 of flange 68, a roof of a cab of a vehicle and a portion of part 36 define a cavity 94, as shown in FIG. 24 and discussed herein. Part 34 defines an opening 96 extending continuously from end 52 to end 58 and continuously from surface 90 to surface 92. Opening 96 is in communication with cavity 94 and a cutout in a trailer that is coupled to the vehicle to provide access to cavity 94 from an inside of the trailer, as discussed herein.

Figure 5:
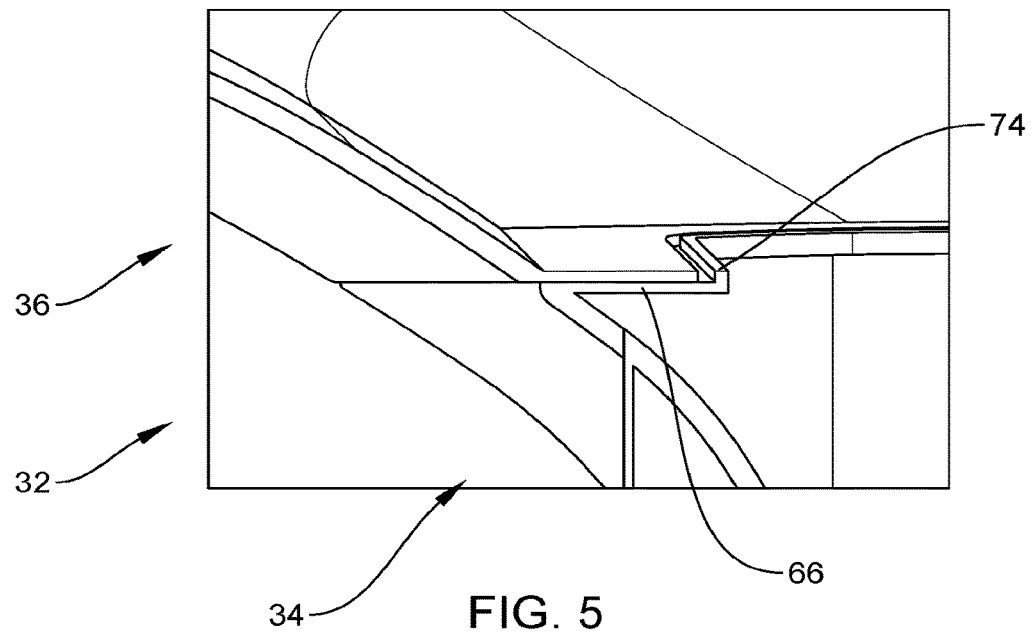
FIG. 5 is an enlarged, close up view of a portion of the wind fairing shown in FIG. 1 shown in Detail A in FIG. 4.
Figure 6:
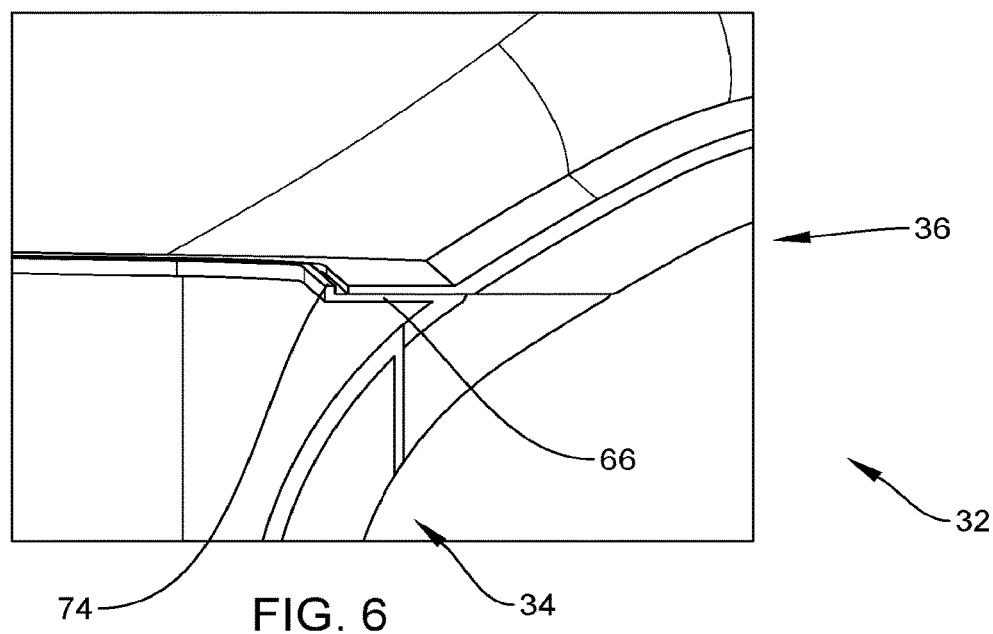
FIG. 6 is an enlarged, close up view of a portion of the wind fairing shown in FIG. 1 shown in Detail B in FIG. 4.
Figure 7:
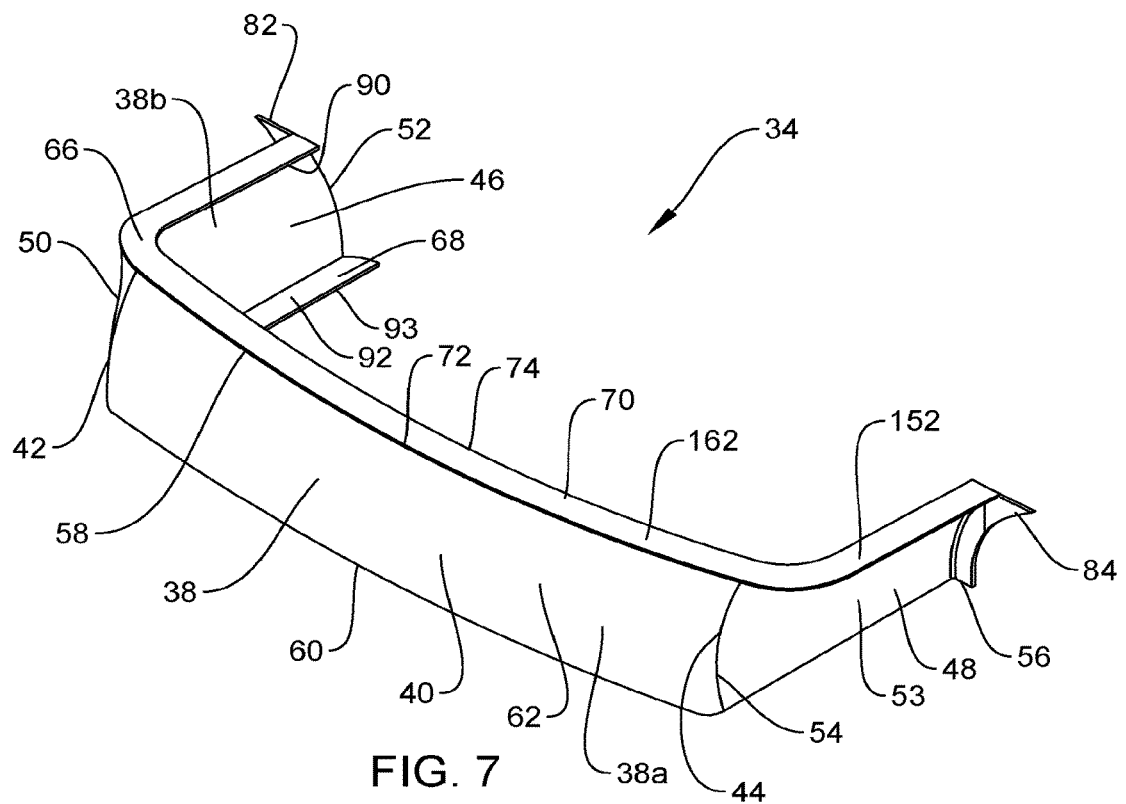
FIG. 7 is a perspective view of a component of the wind fairing shown in FIG. 1.
Figure 8:
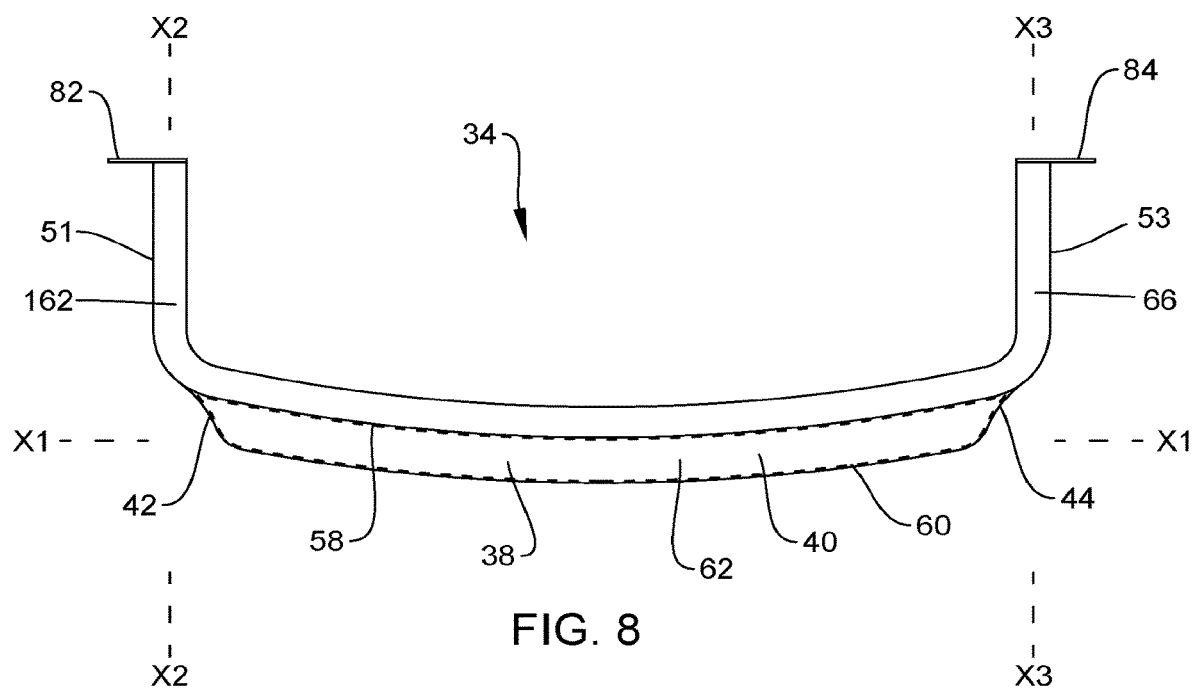
FIG. 8 is a top view of the component shown in FIG. 7.

Part 36 comprises a body 98 having a side wall 100 and a side wall 102 opposite side wall 100. Body 98 comprises a front wall 104 extending from side wall 100 to side wall 102. Body 98 comprises a flange 106 extending from a bottom of body 98 such that flange 106 extends continuously from an end 108 of side wall 100 to front wall 104, across an entire width of front wall 104, and from front wall 104 to an end 110 of side wall 102. Flange 106 is configured to directly engage flange 66. That is, a planar surface of flange 106 directly engages a planar surface of flange 66 to couple part 36 to part 34 such that part 36 is unable to pivot relative to part 34. In some embodiments, flange 106 is positioned between lip 74 and edge 72, as best shown in FIGS. 5 and 6. In some embodiments, part 36 is monolithically and/or integrally formed.

Flange 106 includes a plurality of spaced apart holes 112 that are each configured to be aligned with one of holes 76 when part 36 is coupled to part 34 such that each of holes 112 is coaxial with one of holes 76. A fastener, such as, for example, bolt 80 is inserted through each pair of aligned holes 76, 112 and a nut 81 is threaded with bolt 80 to maintain bolt 80 in aligned holes 76, 112 to couple part 36 to part 32 such that part 36 is fixed to part 34 and is unable to slide or pivot relative to part 34. In some embodiments, holes 112 can have various shape configurations, such as, for example, circular, oval, oblong, polygonal, irregular, uniform, non-uniform, variable and/or tapered. In some embodiments, part 36 is free of any holes, such as, for example, screw holes that extend parallel to axis X1, axis X2 and/or axis X3. In some embodiments, side wall 100, side wall 102 and front wall 104 are is free of any holes, such as, for example, screw holes that extend into or through an outer surface of side wall 100, an outer surface of side wall 102, or an outer surface of front wall 104 or opposite inner surfaces side wall 100, side wall 102 and front wall 104. That is, all of the screw holes of part 36 are included flange 106.

Figure 17:
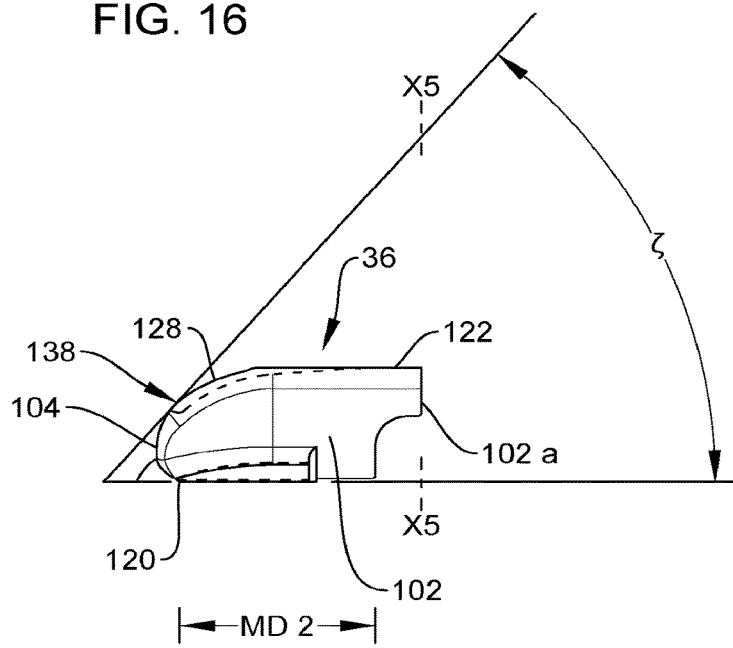
FIG. 17 is a side view of the component shown in FIG. 14.
Figure 18:
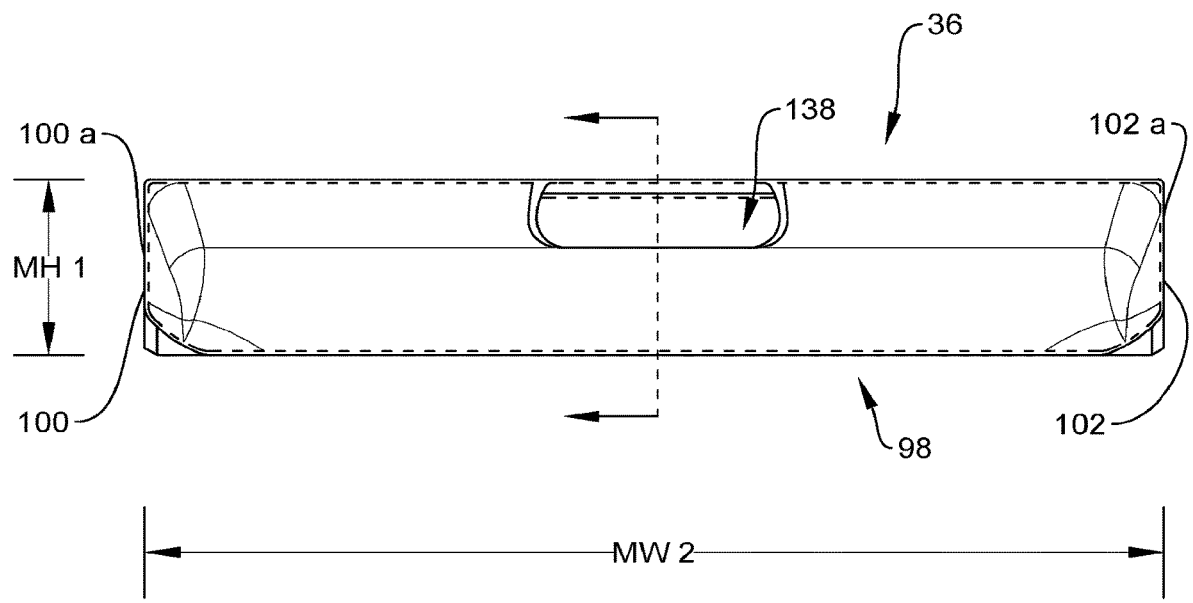
FIG. 18 is a front view of the component shown in FIG. 14.
Figure 19:
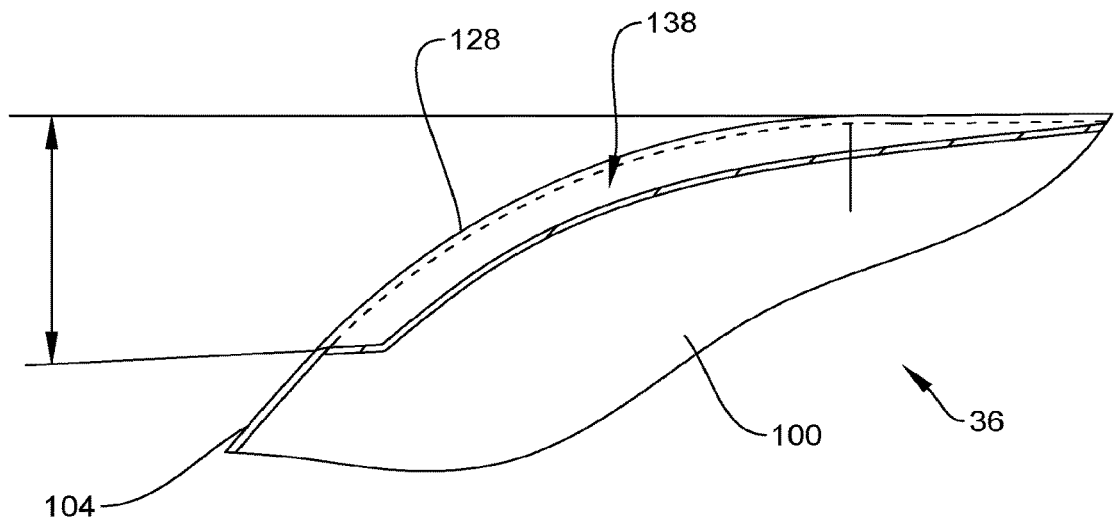
FIG. 19 is a side view of the component shown in FIG. 14.

In some embodiments, part 36 has a size and/or dimension such that part 36 is incapable of being nested within part 34. In some embodiments, part 36 has a maximum depth along axes X2, X3 that is greater than a maximum depth of part 34 along axes X2, X3 when part 36 is coupled to part 34 such that part 36 is incapable of being nested within part 34. For example, in some embodiments, part 36 has a maximum depth MD2 along axes X2, X3 wherein MD2 is defined by the distance from outer surface 128 to an end of side wall 100 or an end 102a of side wall 102, as shown in FIG. 17. MD2 is greater than MD1. In some embodiments, part 36 has a maximum width along axis X1 that is greater than a maximum width of part 34 along axis X1 when part 36 is coupled to part 34 such that part 36 is incapable of being nested within part 34. For example, in some embodiments, part 36 has a maximum width MW2 along axis X1 wherein MW2 is defined by the distance from an outer surface 100a of side wall 100 to an outer surface 102a of side wall 102, as shown in FIG. 18. MW2 is greater than MW1.

In some embodiments, surface 62 is flush with an outer surface 114 of front wall 104, an outer surface 51 of section 46 is flush with an outer surface 116 of side wall 116 and an outer surface 53 of section 48 is flush with an outer surface 118 of side wall 118 when part 36 is coupled to part 34. That is, there are no gaps, spaces, or cavities between surface 62 and surface 114, between surface 51 and surface 116, or between surface 53 and surface 118 when part 36 is coupled to part 34. In some embodiments, any gaps, spaces, or cavities between surface 62 and surface 114, any gaps, spaces, or cavities between surface 51 and surface 116, and/or any gaps, spaces, or cavities between surface 53 and surface 116 are filled with a material, such as, for example, a filler, sealant, adhesive, etc. such that surface 62 is flush with surface 114, surface 51 is flush with surface 116 and surface 53 is flush with surface 116 when part 36 is coupled to part 34.

Front wall 104 extends along a vertical axis, such as, for example, a longitudinal axis X5 from a top of front wall 104, such as, for example, an end 120 of front wall 104 and a bottom of front wall 104, such as, for example, an end 122 of front wall 104 that is opposite end 122. Body 98 includes a corner 120 at an interface between side wall 100 and front wall 104 and a corner 122 at an interface between side wall 102 and front wall 104.

Figure 16:
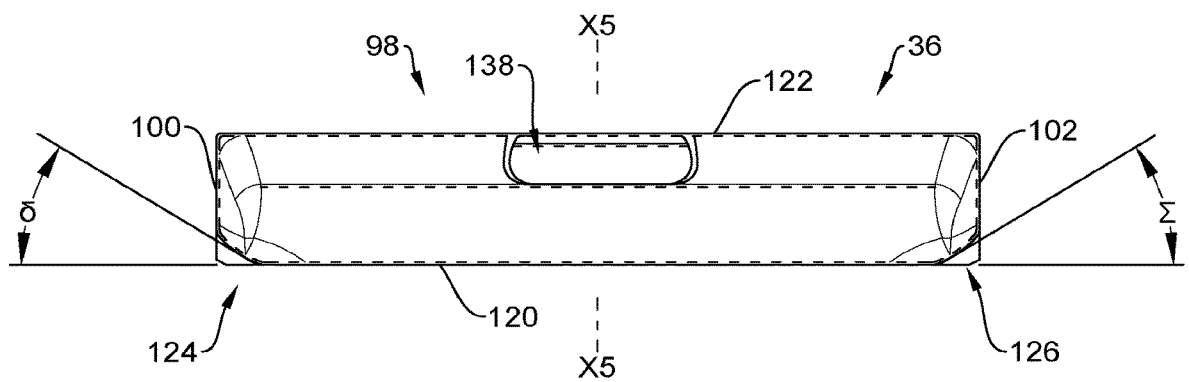
FIG. 16 is a front view of the component shown in FIG. 14.

In some embodiments, corners 124, 126 are each tapered inwardly such that corner 124 extends at an angle δ relative to axis X5 and corner 126 extends at an angle ε relative to axis X5, as also shown in FIG. 16. In some embodiments, angle ε is different than angle δ. In some embodiments, angle ε is an inverse angle of angle δ. In some embodiments, angle ε is equal to angle δ. In some embodiments, angle δ and angle ε are blend angles that are configured to form a smooth transition with part 36 when part 36 is coupled to part 34. That is, angle α is equal to angle δ and angle β is equal to angle ε such that the interface between ends 42, 50 smoothly transitions into and/or is flush with corner 124 and the interface between ends 44, 54 smoothly transitions into and/or is flush with corner 126. In some embodiments, angle δ and angle ε are blend angles between about 5 degrees and about 65 degrees. In some embodiments, angle δ and angle ε are blend angles between about 15 degrees and about 55 degrees. In some embodiments, angle δ and angle ε are blend angles between about 25 degrees and about 45 degrees. In some embodiments, angle δ and angle ε are blend angles of 35 degrees. In some embodiments, corner 124 and/or corner 126 may be disposed at alternate orientations, relative to axis X5, such as, for example, transverse, perpendicular and/or other angular orientations such as acute or obtuse, and/or may be offset or staggered.

In some embodiments, an outer surface 128 of front wall 104 is convexly curved between end 120 and end 122 and an opposite inner surface 130 of front wall 104 is concavely curved between end 120 and end 122 such that front wall 104 extends at an angle ζ relative to axis X5, as shown in FIG. 17. In some embodiments, angle ζ is a blend angle that is configured to form a smooth transition with part 36 when part 36 is coupled to part 34. That is, angle ζ is equal to angle γ such that section 40 smoothly transitions into and/or is flush with front wall 104. In some embodiments, angle is a blend angle ζ between about 20 degrees and about 80 degrees. In some embodiments, angle ζ is a blend angle between about 30 degrees and about 70 degrees. In some embodiments, angle ζ is a blend angle between about 40 degrees and about 60 degrees. In some embodiments, angle ζ is a blend angle of 50 degrees. In some embodiments, front wall 104 may be disposed at alternate orientations, relative to axis X5, such as, for example, transverse, perpendicular and/or other angular orientations such as acute or obtuse, and/or may be offset or staggered.

Surface 130 of front wall 104 and a top surface 132 of flange 106 define a cavity 134 that is in communication with cavity 94, as shown in FIG. 24. Part 36 defines an opening 136 extending continuously from side wall 100 to side wall 102 and continuously from surface 130 to surface 132. Opening 136 is in communication with cavity 134 and a cutout in a trailer that is coupled to the vehicle to provide access to cavity 134 from an inside of the trailer. In some embodiments, cavities 94, 134 are configured to provide storage space within wind fairing 32 when wind fairing 32 is coupled to a vehicle and a trailer that is coupled to the vehicle. The storage space is accessed through the cutout in the trailer and opening 96 and/or opening 136. In some embodiments, part 36 is incapable of being positioned in cavity 94 and part 34 is incapable of being positioned in cavity 136 such that no portion of part 36 is positioned in cavity 94 when part 36 is coupled to part 34 and no portion of part 34 is positioned in cavity 136 when part 36 is coupled to part 34.

In some embodiments, part 36 includes a cutout 138 extending into surface 114. In some embodiments, cutout 138 is configured for disposal of lamps, lights, markers, reflective devices and/or associated equipment. Cutout 138 is positioned between side wall 100 and side wall 102. In some embodiments, cutout 138 is positioned equidistant between outer surface 100a of side wall 100 and outer surface 102a of side wall 102. In some embodiments, part 36 is free of any cutouts, recesses, cavities, holes, sockets and/or openings in side wall 100 and/or side wall 102 that are configured for disposal of lamps, lights, markers, reflective devices and/or associated equipment. In some embodiments, part 36 is free of any cutouts, recesses, cavities, holes, sockets and/or openings at an interface between side wall 100 and front wall 104 and/or at an interface between side wall 102 and front wall 104. In some embodiments, part 36 does not include any lamps, lights, markers, reflective devices and/or associated equipment coupled to part 36 at the interface between side wall 100 and front wall 104 and/or at the interface between side wall 102 and front wall 104.

Part 36 has a maximum height MH1 defined by the distance from end 120 to end 122, as shown in FIG. 18. In some embodiments, system 30 includes only on part 36. In some embodiments, system 30 includes multiple parts 36. For example, in some embodiments, part 36 is a first part 36 and system 30 includes a part 136, which is a second part 36, a part 236, which is a third part 36, and a part 336, which is a fourth part 36. Parts 136, 236, 336 are similar to part 36 and vary from part 36 only in that parts 136, 236, 336 include one or more sizes and/or dimensions that is/are different than a size and/or dimension of part 36. Parts 36, 136, 236, 336 are each configured to be coupled to part 34, as discussed herein, and thus provide system 30 with a plurality of combinations to customize wind fairings for different vehicles, such as, for example, different make vehicles, different model vehicles and different year vehicles. For example, the combination of part 34 and part 36 produces wind fairing 32, which may be used in connection with a first vehicle, such as, for example, vehicle 142. The combination of part 34 and part 136 produces a wind fairing that is similar to wind fairing 32, but differs from wind fairing 32 with respect to one or more sizes and/or dimensions and is configured for use with a second vehicle that is similar to vehicle 142, but differs from vehicle 142 with respect to one or more sizes and/or dimensions. Likewise, the combination of part 34 and part 236 produces a wind fairing that is similar to wind fairing 32 and the wind fairing produced by the combination of part 34 and part 136, but differs from wind fairing 32 and the wind fairing produced by the combination of part 34 and part 136 with respect to one or more sizes and/or dimensions and is configured for use with a third vehicle that is similar to vehicle 142 and the second vehicle, but differs from vehicle 142 and the second vehicle with respect to one or more sizes and/or dimensions. Similarly, the combination of part 34 and part 336 produces a wind fairing that is similar to wind fairing 32, the wind fairing produced by the combination of part 34 and part 136 and the wind fairing produced by the combination of part 34 and part 236, but differs from wind fairing 32, the wind fairing produced by the combination of part 34 and part 136 and the wind fairing produced by the combination of part 34 and part 236 with respect to one or more sizes and/or dimensions and is configured for use with a fourth vehicle that is similar to vehicle 142, the second vehicle and the third vehicle, but differs from vehicle 142, the second vehicle and the third vehicle with respect to one or more sizes and/or dimensions.

Part 136 has a maximum height MH2 defined by the distance from end 120 of part 136 to end 122 of part 136, a maximum width MW3 defined by the distance from outer surface 100a of part 136 to outer surface 102a of part 136, and a maximum depth MD3 defined by the distance from outer surface 128 of part 136 to an end of side wall 100 of part 136 or end 102a of side wall 102 of part 136. Part 236 has a maximum height MH3 defined by the distance from end 120 of part 236 to end 122 of part 136, a maximum width MW4 defined by the distance from outer surface 100a of part 236 to outer surface 102a of part 236, and a maximum depth MD4 defined by the distance from outer surface 128 of part 236 to an end of side wall 100 of part 236 or end 102a of side wall 102 of part 236. Part 336 has a maximum height MH4 defined by the distance from end 120 of part 336 to end 122 of part 336, a maximum width MW5 defined by the distance from outer surface 100a of part 336 to outer surface 102a of part 336, and a maximum depth MD5 defined by the distance from outer surface 128 of part 336 to an end of side wall 100 of part 336 or end 102a of side wall 102 of part 336.

In some embodiments, maximum height MH2 is greater to or less than maximum height MH1, maximum height MH3 is greater to or less than maximum height MH2 and maximum height MH4 is greater to or less than maximum height MH3. In some embodiments, maximum heights MH1, MH2, MH3 and MH4 are all different. In some embodiments, maximum width MW3 is greater to or less than maximum width MW2, maximum width MW4 is greater to or less than maximum width MW3, and maximum width MW5 is greater to or less than maximum width MW4. In some embodiments, maximum widths MW2, MW3, MW4 and MW5 are all different. In some embodiments, maximum depth MD3 is greater to or less than maximum depth MD2, maximum depth MD4 is greater to or less than maximum depth MD3, and maximum depth MD5 is greater to or less than maximum depth MD4. In some embodiments, maximum depths MD2, MD3, MD4 and MD5 are all different.

In operation and use, components of system 30 are selected to produce a wind fairing to fit a vehicle and a trailer that is coupled to the vehicle, such as, for example, vehicle 142 and a trailer 144 that is coupled to vehicle 142. In one embodiment, part 34 and part 36 are selected to form wind fairing 32 to fit vehicle 142 and trailer 144, as shown in FIGS. 21-24. It should be noted that vehicle 142 is shown in FIGS. 21-24 with parts removed to improve clarity. Part 34 is bonded to a roof 146 of a cab 148 of vehicle 142 using a urethane adhesive sealant. In particular, a bead of adhesive sealant is applied to a bottom surface 93 of flange 68 that is opposite top surface 92 of flange 68. In some embodiments, holes 78 are aligned with holes in roof 146 and part 34 is then placed on roof 146 such that surface 93 directly engages roof 146. Bolts 80 are positioned through holes 78 and the holes in roof 146 and nuts 81 are threaded with each of bolts 80 to maintain each of bolts 80 in one of holes 78 and one of holes in roof 146. In some embodiments, the holes in roof 146 are pre-drilled such that the holes in roof 146 are present before part 34 is coupled to roof 146. In some embodiments, the holes in roof 146 are drilled. In some embodiments, part 34 is placed on roof 146 such that surface 93 directly engages roof 146 and a drill bit is inserted through holes 78 to create holes in roof 146 that are each aligned with one of holes 78. Bolts 80 are positioned through holes 78 and the holes in roof 146 and nuts 81 are threaded with each of bolts 80 to maintain each of bolts 80 in one of holes 78 and one of holes in roof 146.

Part 36 is moved relative to part 34 after part 34 is coupled to roof 146 such that body 98 directly engages trailer 144. In particular, inner surface 130 of front wall 104 directly engages a top wall 150 of trailer 144, an inner surface 152 of side wall 100 directly engages a side wall 154 of trailer 144 and an inner surface 156 of side wall 102 directly engages a side wall 158 of trailer 144. Adhesive is applied to a bottom surface 160 of flange 106 and part 36 is moved relative to part 34 such that surface 160 directly engages a top surface 162 of flange 66 and holes 112 are aligned with holes 76 such that holes 76 are coaxial with holes 112. Bolts 80 are positioned through aligned holes 76, 112 and nuts 81 are threaded with bolts 80 to maintain each of bolts 80 in one set of aligned holes 76, 112. In some embodiments, a bead of sealant is applied to a joint defined by the interface of parts 34, 36 and to all joints defined by the interface of part 36 and trailer 144.

In some embodiments, part 36 includes one or a plurality of holes 164 that each extend through surfaces 128, 130, one or a plurality of holes 166 that each extend through surface 152 and an opposite outer surface 170 of side wall 100, and one or a plurality of holes 168 that each extend through surface 156 and an opposite outer surface 172 of side wall 102. In some embodiments, hole(s) 166 is/are identical to hole(s) 168. Fasteners, such as, for example, bolts 80 are positioned through holes 164, 166, 168 and into holes in trailer 144. Nuts 81 are threaded with bolts 80 to maintain each of bolts 80 in one of holes 164, 166, 168 and one of the holes in trailer 144. In some embodiments, the holes in trailer 144 are pre-drilled such that the holes in trailer 144 are present before part 36 is coupled to trailer 144. In some embodiments, the holes in trailer 144 are drilled. In some embodiments, part 36 is placed on trailer 144 such that inner surfaces of front wall 104 and side walls 100, 102 directly engage trailer 144, as discussed herein, and a drill bit is inserted through holes 164, 166, 168 to create holes in trailer 144 that are each aligned with one of holes 164, 166, 168. Bolts 80 are positioned through holes 164, 166, 168 and the holes in trailer 144 and nuts 81 are threaded with each of bolts 80 to maintain each of bolts 80 in one of holes 164, 166, 168 and one of holes in trailer 144.

Figure 4:
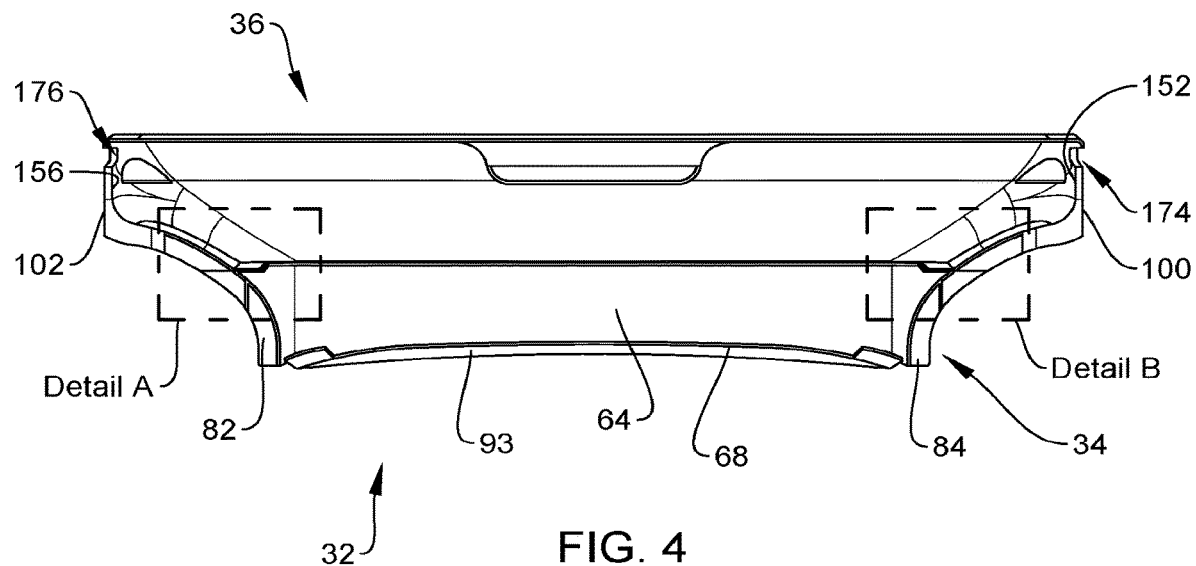
FIG. 4 is a rear view of the wind fairing shown in FIG. 1.
Figure 20:
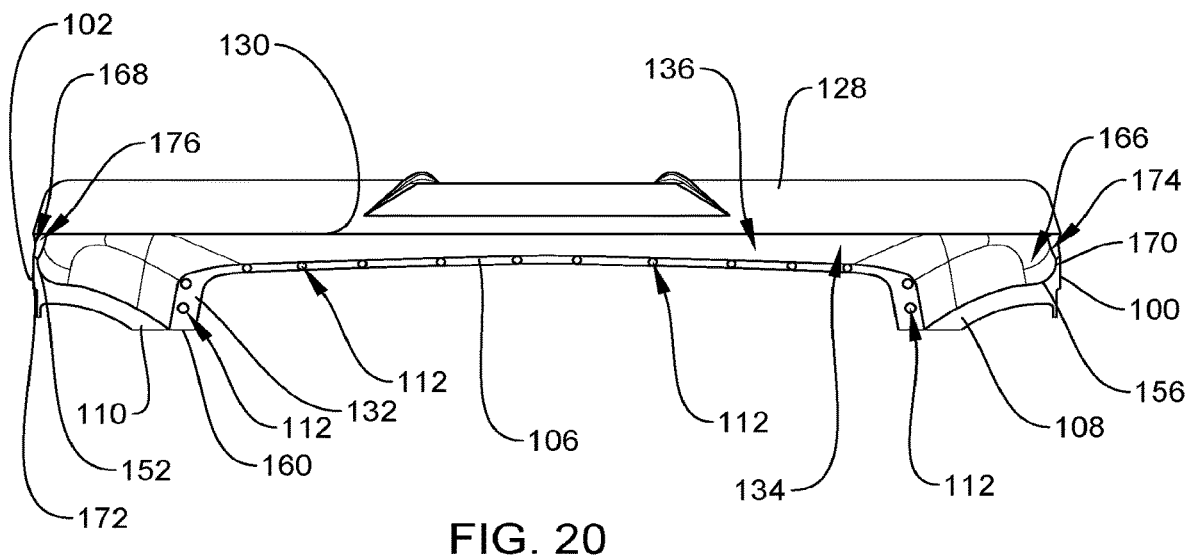
FIG. 20 is a rear view of the component shown in FIG. 14.
Figure 21:
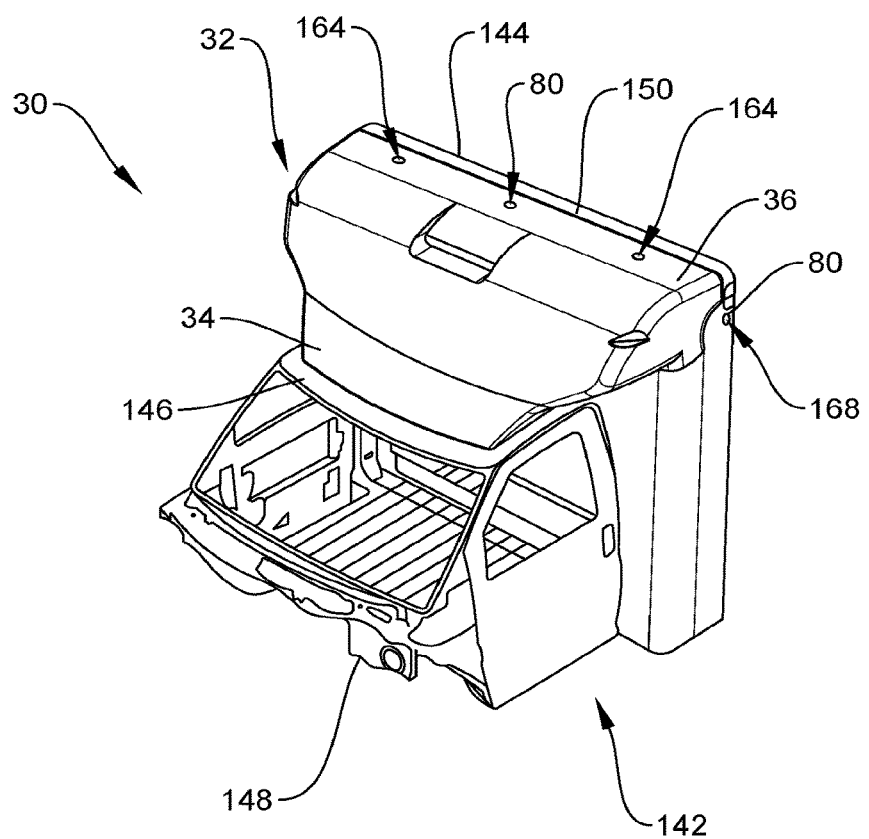
FIG. 21 is a perspective view of a system in accordance with the principles of the present disclosure, with the wind fairing shown in FIG. 1 coupled to a vehicle.
Figure 22:
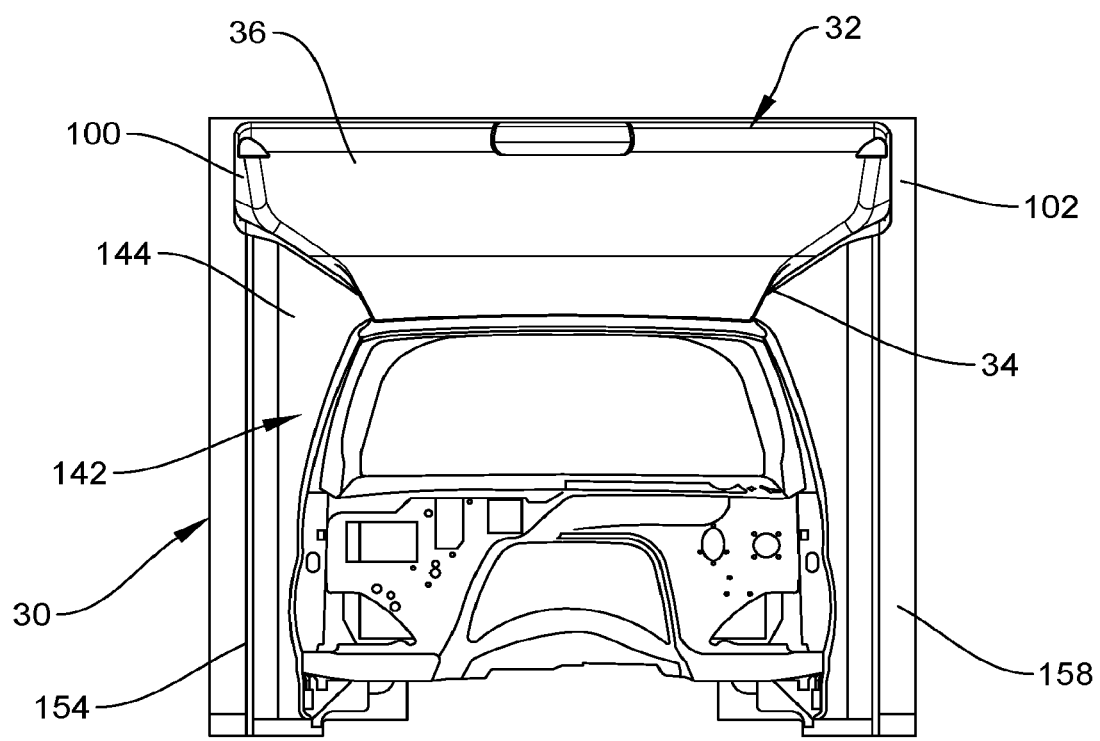
FIG. 22 is a front view of the system shown in FIG. 21.
Figure 23:
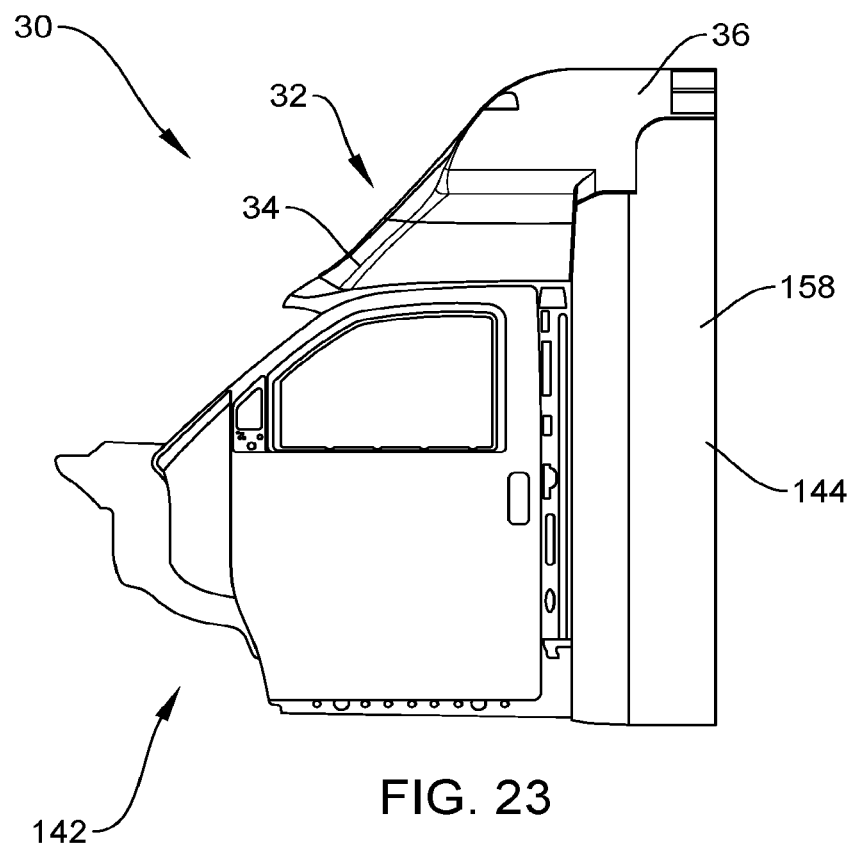
FIG. 23 is a side view of the system shown in FIG. 21.

In some embodiments, part 36 includes a notch 174 that extends into an outer surface of side wall 100 without extending through an opposite inner surface of side wall 100 and a notch 176 that extends into an outer surface of side wall 102 without extending through an opposite inner surface of side wall 102, as best shown in FIGS. 4 and 20. Notches 174, 176 are configured for disposal of corner posts of trailer 144 that extend along side wall 154 and/or side wall 158.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A wind fairing comprising:
   a first part comprising a first flange including a first surface and a second surface that extends transverse to the first surface; and
   a second part comprising a second flange including a third surface and a fourth surface that extends transverse to the third surface, the first surface being configured to engage the third surface and the second surface being configured to engage the fourth surface to couple the second part to the first part.

2. The wind fairing recited in claim 1, wherein the first surface extends perpendicular to the second surface.

3. The wind fairing recited in claim 1, wherein the third surface extends perpendicular to the fourth surface.

4. The wind fairing recited in claim 1, wherein:
   the first surface extends perpendicular to the second surface; and
   the third surface extends perpendicular to the fourth surface.

5. The wind fairing recited in claim 1, wherein the first surface extends parallel to a longitudinal axis, the second surface being configured to engage the fourth surface to prevent relative movement between the second part and the first part in one direction along the longitudinal axis.

6. The wind fairing recited in claim 1, wherein the second surface extends proximally from the first surface and the fourth surface extends distally from the third surface.

7. The wind fairing recited in claim 1, wherein the first part extends along a longitudinal axis between opposite proximal and distal ends, the proximal end including the first flange, the first surface extending perpendicular to the longitudinal axis.

8. The wind fairing recited in claim 1, wherein the first part extends along a longitudinal axis between opposite proximal and distal ends, the proximal end including the first flange, the distal end including a third flange.

9. The wind fairing recited in claim 8, wherein the first surface and the third flange each extend perpendicular to the longitudinal axis.

10. The wind fairing recited in claim 9, wherein the first surface includes spaced apart first holes and the third flange comprises spaced apart second holes, the holes each extending parallel to the longitudinal axis, the second holes each being aligned with one of the first holes.

11. The wind fairing recited in claim 1, wherein the second part includes opposite inner and outer surfaces, the second flange extending from the inner surface, the second part including a cutout extending into the outer surface.

12. A wind fairing comprising:
   a first part extending along a first longitudinal axis between opposite proximal and distal ends, the proximal end comprising a first flange extending perpendicular to the first longitudinal axis; and a second part extending along a second longitudinal axis between opposite proximal and distal ends, the distal end of the second part comprising a second flange extending perpendicular to the second longitudinal axis, the first flange being configured to engage the second flange to couple the second part to the first part.

13. The wind fairing recited in claim 12, wherein the second longitudinal axis extends parallel to the first longitudinal axis.

14. The wind fairing recited in claim 12, wherein the first part extends along a horizontal axis between opposite anterior and posterior ends, the first flange extending parallel to the horizontal axis.

15. The wind fairing recited in claim 14, wherein the first longitudinal axis extends perpendicular to the horizontal axis.

16. The wind fairing recited in claim 12, wherein the second part extends along a horizontal axis between opposite anterior and posterior ends, the second flange extending parallel to the horizontal axis.

17. The wind fairing recited in claim 16, wherein the second longitudinal axis extends perpendicular to the horizontal axis.

18. The wind fairing recited in claim 12, wherein:

the first part extends along a first horizontal axis between opposite anterior and posterior ends, the first flange extending parallel to the first horizontal axis;

the second part extends along a second horizontal axis between opposite anterior and posterior ends, the second flange extending parallel to the second horizontal axis.

19. The wind fairing recited in claim 18, wherein:

the first longitudinal axis extends perpendicular to the first horizontal axis; and the second longitudinal axis extends perpendicular to the second horizontal axis.

20. A wind fairing comprising:

a first part comprising a first flange including a first surface and a second surface that extends transverse to the first surface; and a second part comprising a second flange including a third surface and a fourth surface that extends transverse to the third surface, the first surface being configured to engage the third surface and the second surface being configured to engage the fourth surface to couple the second part to the first part, wherein the first part extends along a first longitudinal axis between opposite proximal and distal ends, the first surface extending perpendicular to the first longitudinal axis, and wherein the second part extends along a second longitudinal axis between opposite proximal and distal ends, the third surface extending perpendicular to the second longitudinal axis.

* * * * *